Figure 1:
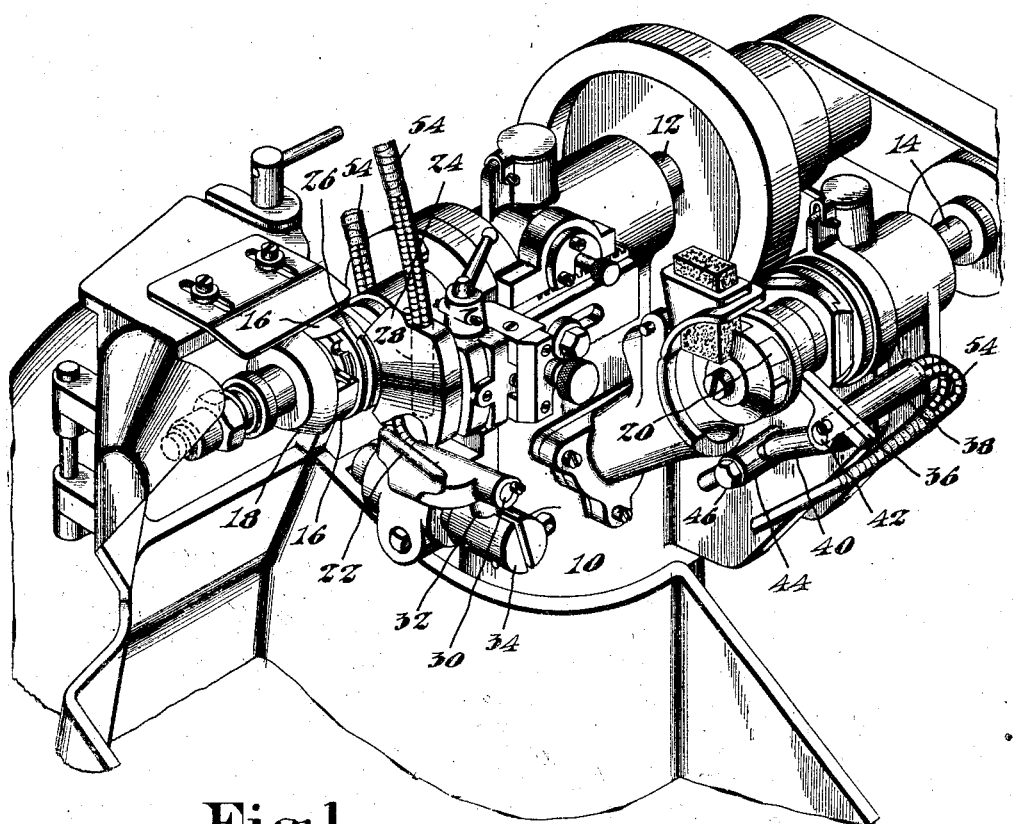

Jan. 5, 1926.

G. L. BEAN 1,568,541

APPARATUS FOR OPERATING ON RUBBER ARTICLES

Filed Jan. 19, 1925

INVENTOR
George L. Bean
By his Attorney
Nelson W. Howard

Patented Jan. 5, 1926.

1,568,541

UNITED STATES PATENT OFFICE.

GEORGE L. BEAN, OF QUINCY, MASSACHUSETTS, ASSIGNOR TO UNITED SHOE MACHINERY CORPORATION, OF PATERSON, NEW JERSEY, A CORPORATION OF NEW JERSEY.

APPARATUS FOR OPERATING ON RUBBER ARTICLES.

Application filed January 19, 1925. Serial No. 3,420.

*To all whom it may concern:*

Be it known that I, GEORGE L. BEAN, a citizen of the United States, residing at Quincy, in the county of Norfolk and Commonwealth of Massachusetts, have invented certain Improvements in Apparatus for Operating on Rubber Articles, of which the following description, in connection with the accompanying drawings, is a specification, like reference characters on the drawings indicating like parts in the several figures.

This invention relates to machines for operating on articles made of or comprising parts made of rubber or a composition containing rubber, or made of any other material having a frictional characteristic similar to that of rubber. The invention affords marked advantages, for example, in a machine for trimming the heels of boots and shoes, and is herein disclosed as embodied in a machine for that purpose. Still, the invention is not limited to that use or to the type of machine illustrated.

It is well known that the coefficient of friction between rubber and metal at ordinary atmospheric temperatures is very great, and that this condition causes great difficulty in trimming heels made of rubber or including a rubber lift. The necessary equipment of a heel-trimming machine includes a heel-rest and a toplift guard relatively to which the heel must be moved to trim progressively around the periphery, but when the heel or toplift is made of rubber the drag due to its engagement with the heel-rest and the toplift guard greatly increases the difficulty of manipulating the work. This difficulty, moreover, is aggravated by the pressure of the heel against the heel-rest and the toplift guard, since it is always necessary to maintain enough pressure to keep the work steady notwithstanding the more or less violent action of the trimming cutter.

Under the conditions explained the difficulty of manipulation and the impairment in the quality of work have caused many manufacturers to equip their heel-trimming machines with devices of one kind or another to lubricate the work-engaging surfaces of the heel-rest and the toplift guard. In some cases, oil, and in other cases soapy water, has been used to lubricate the elements under discussion, and while these lubricants enable rubber heels to slide more easily they soil the heels and sometimes stain the uppers either by reason of a too copious supply or by soiling the operator's hands. Furthermore, the lubricating devices encumber the machine, and the lubricant causes the dust and dirt of trimming to accumulate rapidly on all the parts coated by it.

In view of the high degree of friction between rubber and metal an object of this invention is to provide improved means for reducing such friction without supplying a lubricating substance to either of such frictional elements that require to be relatively moved while engaging each other. I have found that the friction between rubber and and a smooth metallic guiding surface may be greatly reduced by heating the latter, and that the degree of heat necessary to accomplish the desired result in a machine for trimming rubber heels need not be great enough to mar the appearance or otherwise harm the heels.

Accordingly a feature of the invention consists in arranging heating means in thermal relation to one or more metallic work-guiding members of an organization comprising an instrumentality for operating upon an article made of, or including a part made of, rubber or similar material, and in which it is necessary to move the work relatively to the guiding member or members while it is in engagement with them and while the aforesaid instrumentality is operating upon the work.

In so far as the invention pertains to heel-trimming machines, a feature consists in heating means arranged to heat the heel-rest or the heel-guard, or both, to the end that rubber heels may slide easily and smoothly thereon and be manipulated with substantially the same degree of facility and trimmed with substantially the same degree of accuracy at leather heels.

The invention is illustrated as applied to both a heel-guard and a heel-rest associated with a cutter-head for shaping the periphery of the heel, and also to a heel-rest associated with a cutter for trimming the rand.

Figure 2:
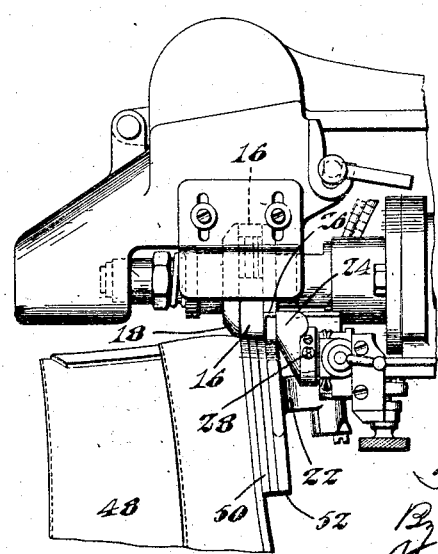

Referring to the drawings:

Fig. 1 is a perspective view of the upper part of an otherwise well-known type of heel-shaping machine equipped with electrically heated heel-guiding elements embodying this invention; and Fig. 2 is a top plan view of a portion of the mechanism included in Fig. 1, and shows a shoe in position to be trimmed.

The general organization of the illustrated machine is similar to that shown in United States Letters Patent No. 961,752, granted June 21, 1910, on application of John N. Busell. The machine comprises a frame or standard 10 the upper part of which provides journals for a main cutter-shaft 12 and a randing shaft 14. The shaft 12 carries a cutter-head, the cutting blades of which are indicated at 16, and a counter-guard 18. The shaft 14 carries a cutter 20 designed to trim the rand.

The blades 16 are used to trim the periphery of a heel presented as shown in Fig. 2, and although the shoe is manipulated by the operative it is guided by the counter-guard 18, by a heel-guard and by a heel-rest 22. The latter sustains the heel against the working stress of the cutters. The heel guard, which is sometimes termed a toplift guard, is formed with a surface 24 to engage the tread of the heel, and with a lip or flange 26 to engage the periphery adjacent to the tread. The heel-guard and the heel-rest are both fixed, but each is mounted to be adjustable as usual in such machines.

The heel-guard is made of metal and is formed with a socket to contain an electrical heating unit 28. The heel-rest 22 is also made of metal and is formed with a socket for an electrical heating unit 30, and with a stem 32 by which it is adjustably mounted in a split holder 34.

An electrically-heated heel-rest 36 is fixed in cooperative relation to the randing cutter 20. This heel-rest is formed with a socket portion 38 and a mounting stem 40. An electrical heating unit 42 is arranged in the socket portion. The stem 40 extends through a fixture 44 and is fastened by a set-screw 46.

The shoe 48 shown in Fig. 2 has a leather heel-base 50 and a rubber tread-lift 52 engaging the guard 24, 26 and the heel-rest 22, but it is obvious that if the heel were made entirely of rubber this guard and the heel-rest would function in the same way as with a heel of the type shown. When trimming all-leather heels the same guard 24, 26 and heel-rests 22, 36 may be used, but in that case the current for heating them need not be turned on. The elements indicated at 54 are armored conductors for supplying current to the heating units.

Having thus described my invention, what I claim as new and desire to secure by Letters Patent of the United States is:

1. A machine comprising an instrumentality for operating upon an article of work made of, or including an element made of, rubber or a composition or substance having a frictional characteristic similar to that of rubber, a stationary metallic guiding member arranged to engage said frictional element to control the course of movement of the work while said instrumentality is operating thereon, and heating means arranged in thermal relation to said stationary guiding element to reduce the frictional resistance between the latter and said frictional element.

2. A machine comprising an instrumentality for operating upon an article of work that requires to be manipulated during such operation and that comprises an element made of rubber or a substance having a frictional characteristic similar to that of rubber, one or more stationary metallic guiding members arranged to engage said frictional element to control the manipulation of the work, and heating means arranged in thermal relation to said one or more guiding members to facilitate such manipulation by reducing the frictional resistance between said element and said guiding member or members.

3. A machine comprising an instrumentality for operating progressively upon an element of work comprising rubber or analogous friction-producing material, a plurality of stationary metallic members arranged to engage and guide such element of work to control the course or progress of operation of said instrumentality, and heating means arranged to heat said stationary guiding members to reduce the frictional resistance between such work element and said members.

4. A machine comprising an instrumentality for operating progressively upon an article of work that must be manipulated during such operation and that comprises an element of rubber or analogous frictional substance, a metallic guiding member arranged to engage said element to control such manipulation, and heating means arranged in thermal relation to said guiding member to facilitate relative sliding movement of said element and said guiding member by reducing the frictional resistance between them.

5. A machine comprising a trimming cutter for operating progressively upon an article of work that must be moved during such operation and that comprises an element of rubber or analogous frictional material, a metallic guiding member arranged to engage said element to guide the work relatively to said cutter, and heating means arranged in thermal relation to said guiding member to facilitate relative sliding movement of said element and said guiding member by reducing the frictional resistance between them.

6. A machine comprising a trimming cutter for operating upon the heel of a shoe, and an electrically heated work-guiding member in cooperative relation to said cutter.

7. A heel-trimming machine comprising a trimming cutter, and an electrically heated toplift guard in cooperative relation thereto.

8. A heel-trimming machine comprising a trimming cutter, and an electrically heated heel-rest in cooperative relation thereto.

9. A heel-trimming machine comprising a trimming cutter, an electrically heated toplift guard, and an electrically heated heel-rest, both of said heated elements being in cooperative relation to said cutter.

10. A heel-trimming machine comprising a cutter for trimming the periphery of a heel, a metallic toplift guard having a socket, and electrical heating means in said socket to heat said guard so that a heel having a rubber tread will slide thereon with relatively little frictional resistance.

11. A heel-trimming machine comprising a cutter for trimming a surface of a heel, a metallic heel-rest having a socket, and electrical heating means in said socket to heat said heel-rest so that a heel having a rubber element bearing thereon will slide with relatively little frictional resistance.

12. A machine comprising an instrumentality for operating upon an element of rubber or analogous friction-producing material, a metallic guiding member relatively to which said element must be moved and by which said element is sustained against the working stress of said instrumentality, and heating means arranged in thermal relation to said guiding member to facilitate relative sliding movement of said element and said guiding member by reducing the frictional resistance between them.

In testimony whereof I have signed my name to this specification.

GEORGE L. BEAN.